No. 766,972. PATENTED AUG. 9, 1904.
T. B. RENNELL.
VEHICLE FRAME.
APPLICATION FILED NOV. 30, 1903.
NO MODEL. 2 SHEETS—SHEET 1.
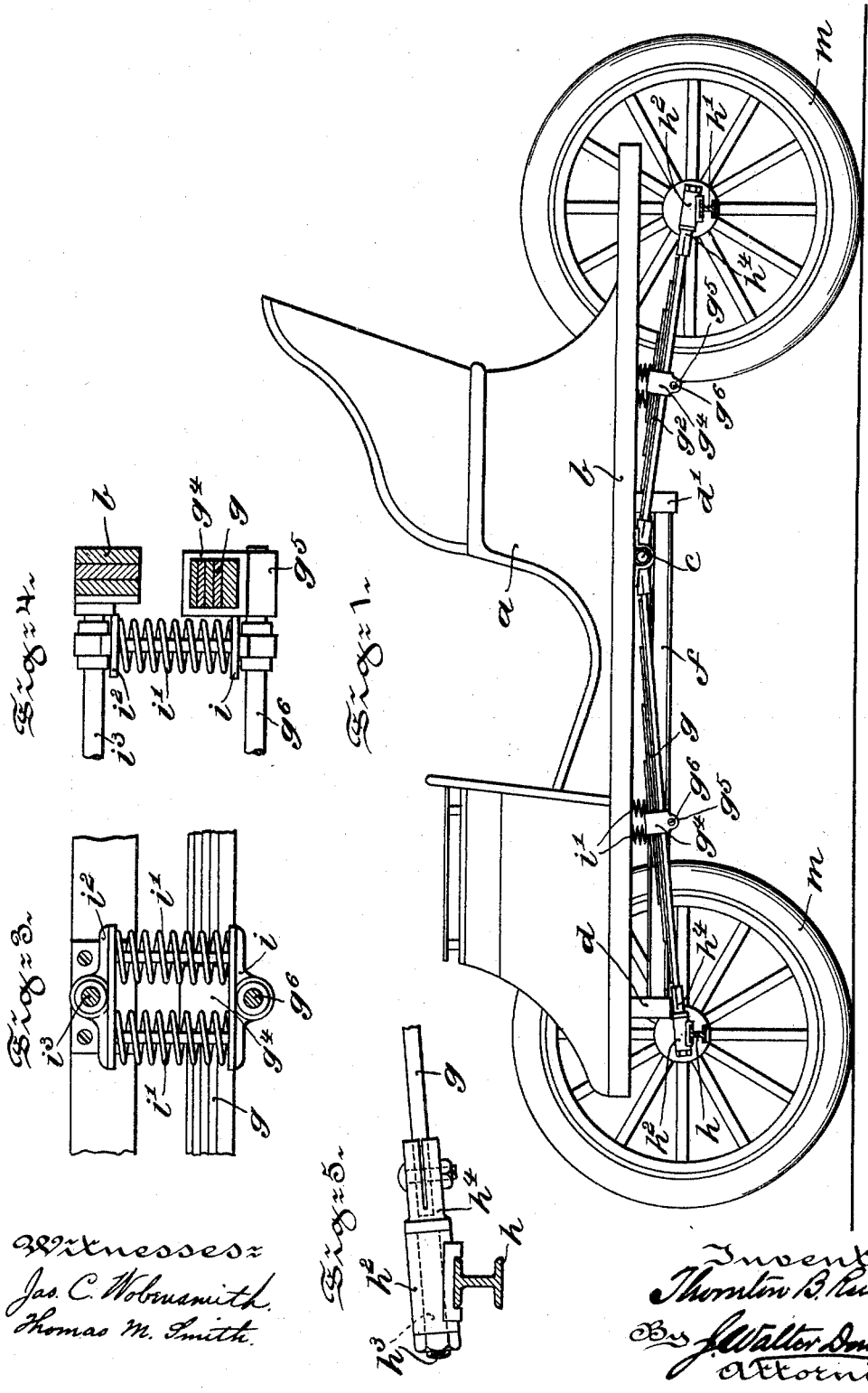

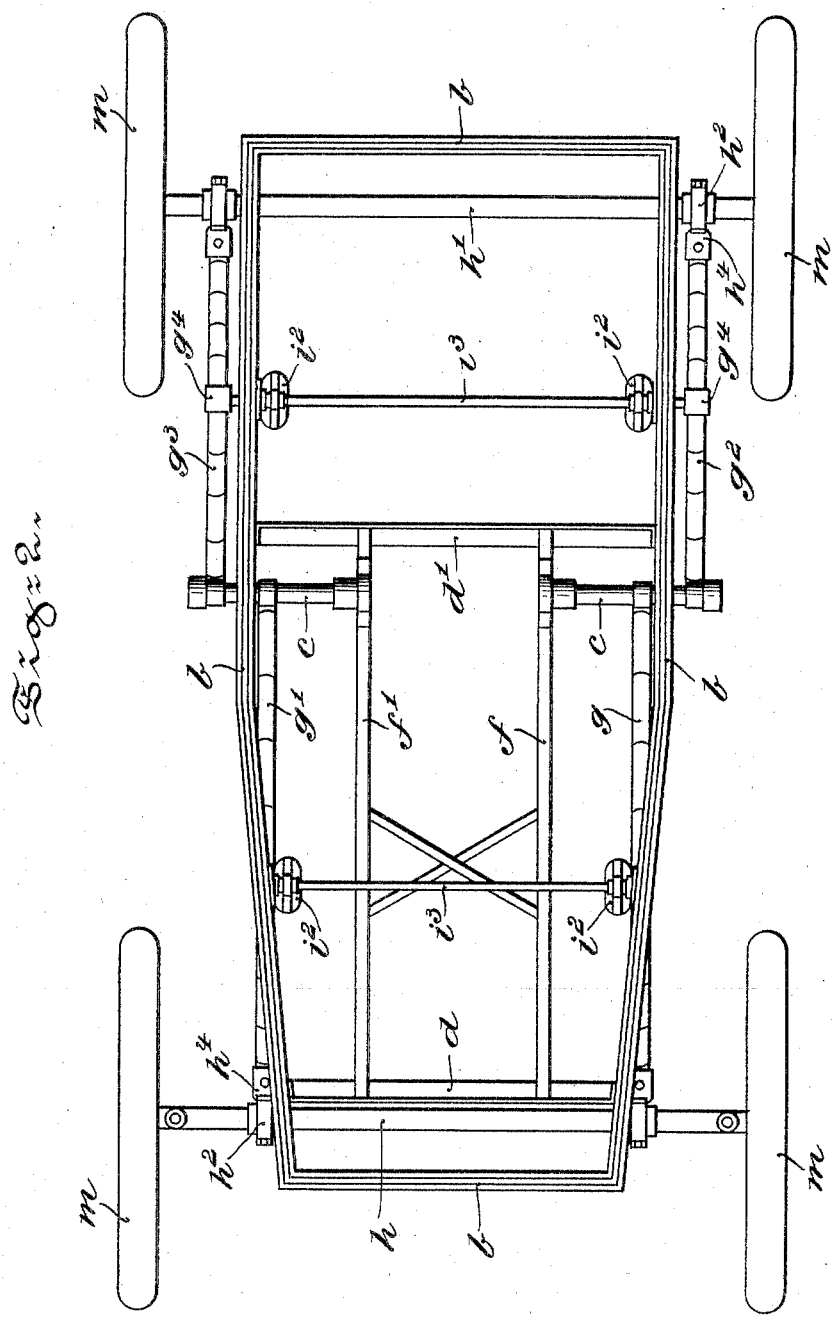

No. 766,972. Patented August 9, 1904.

UNITED STATES PATENT OFFICE.

THORNTON B. RENNELL, OF DENVER, COLORADO.

VEHICLE-FRAME.

SPECIFICATION forming part of Letters Patent No. 766,972, dated August 9, 1904.

Application filed November 30, 1903. Serial No. 183,122. (No model.)

*To all whom it may concern:*

Be it known that I, THORNTON B. RENNELL, a citizen of the United States, residing at Denver, in the county of Denver and State of Colorado, have invented certain new and useful Improvements in Vehicle-Frames, of which the following is a specification.

My invention has relation to a framework whereon the body of a vehicle may be supported and by means of which the front and rear axles may be connected; and in such connection it relates to the general construction and arrangement of such a framework.

The principal object of my present invention is to provide a strong yet light framework for vehicles, and particularly of the automobile type, wherein it is desirable that the framework should not only be light and strong in construction, but also arranged so as to enable motive parts of the automobile to be safely or reliably supported and carried by the vehicle-framework.

The nature and scope of my invention will be more fully understood from the following description, taken in connection with the accompanying drawings, forming part hereof, in which—

Figure 1 is a side elevational view, partly in section, of a framework embodying main features of my invention with a vehicle-body arranged thereon. Fig. 2 is a top or plan view of the framework. Figs. 3, 4, and 5 are views of certain details of construction.

Referring to the drawings, the body $a$ of the vehicle rests on the sill $b$ and is secured thereto in any suitable manner. The sill $b$ comprises a substantially rectangular frame and is preferably built up of laminated strips of wood or other suitable material, as shown in Figs. 2 and 4.

On the sides of the rectangular sill $b$, and preferably on the wider edge thereof, are secured tubes $c$, extending from beyond the sides of the sill $b$ toward the center of the framework and preferably arranged in alinement with each other. Braces $d$ and $d'$ connect the sides of the sill $b$ at suitable points and support beams $f$ and $f'$, arranged longitudinally in the framework. These beams $f$ and $f'$ are for the purpose of carrying the engine or other prime mover and such other mechanism (not shown) of the motor-vehicle which may be arranged thereon in any preferred manner.

The tubes $c$ have their inner ends resting on and secured to the beams $f$ and $f'$, as illustrated in Fig. 2. Intermediate of the ends of the tubes $c$ plate-springs $g$ $g'$ and $g^2$ $g^3$ are pivotally fastened, so as to slightly rotate about said tubes. These plate-springs $g$ $g'$ and $g^2$ $g^3$ extend from the tubes $c$ toward the ends of framework in a downward direction at a slight angle from the horizontal and have their free ends secured to the respective front and rear axles $h$ and $h'$ in a manner to be hereinafter more fully explained. The springs $g$ $g'$ and $g^2$ $g^3$ are composed of a series of flat strips clamped together at their centers by means of a band $g^4$, having on one of its faces a lug $g^5$, through which passes and has fastened therein a tie-rod $g^6$, serving to connect one plate-spring to a similarly-arranged plate-spring on the opposite side of the framework.

As clearly illustrated in Figs. 3 and 4, the tie-rods $g^6$ carry brackets $i$, arranged adjacent to the springs $g$ $g'$ and $g^2$ $g^3$. These brackets support helical springs $i'$, which are supported at their upper ends by similar brackets $i^2$, carried by the tie-rods $i^3$, which serve also to connect the sides of the sill $b$.

The respective front and rear axles $h$ and $h'$ are preferably made I shape in section and are arranged slightly below the axis of the wheels $m$. The free ends of the springs $g$ $g'$ and $g^2$ $g^3$ are fastened to these axles in the following preferred manner. Secured to the axles $h$ and $h'$ are brackets $h^2$, through which pass bolts $h^3$ of the casting $h^4$, secured to one of the plates of each of the springs $g$ $g'$ and $g^2$ $g^3$. The brackets $h^2$ are so designed that the center line of the bolts $h^3$ lies in the axis of the wheels, thereby obviating any twisting movement of the axles $h$ and $h'$.

It will be observed that the hereinbefore-described arrangement affords a construction wherein all parts coact to form a light yet strong and durable vehicle-framework. The sill $b$ is braced at frequent intervals by the braces $d$ and $d'$, tie-rods $i^3$, and tubes $c$. Moreover, the tubes $c$ can be employed, if desired, for the reception of a suitable transmission-shaft to drive the rear wheels, as the springs $g^2$ and $g^3$ are pivotally secured thereto and will therefore maintain the axis of the rear wheels at a substantially uniform distance from the tube $c$. Any tendency to lengthen the wheel-base by the compression of the helical springs $i''$ and consequent rotation of the springs $g$ $g'$ and $g^2$ $g^3$ about the tube $c$ as a center will be counteracted by bending and correspondingly shortening the said springs.

Having thus described the nature and objects of my invention, what I claim as new, and desire to secure by Letters Patent, is—

1. In a vehicle-framework, the combination of a sill, a tube secured to said sill intermediate of its ends, plate-springs, each pivotally secured at one end to said tube and projecting downward and away from said tube and a downwardly-projecting resilient connection interposed between the plate-springs and said sill, the plate-springs provided with axles at their free ends.

2. A framework for vehicles, comprising a substantially rectangular sill, braces connecting the sides of said sill, beams connecting said braces, tubes secured to said beams and the sides of the sill, and plate-springs having one of their ends pivotally secured to said tubes and having their centers resiliently secured to the sill said springs carrying axles at their free ends.

3. In a vehicle-framework of the character described, means for securing the free ends of plate-springs to axles, comprising a bolt secured to the free end of each of said plate-springs, and a bracket through which the bolt passes and so arranged that the center of the bolt lies in a plane of the axis of wheels carried by said axle.

In testimony whereof I have hereunto set my signature in the presence of two subscribing witnesses.

THORNTON B. RENNELL.

Witnesses:
 LAURA L. DAVIS,
 ELMER MARSH.